United States Patent
Wetzel et al.

(10) Patent No.: US 11,614,166 B2
(45) Date of Patent: Mar. 28, 2023

(54) ELECTROMECHANICAL PARK LOCK

(71) Applicant: Robert Bosch GmbH, Stuttgart (DE)

(72) Inventors: Gerhard Wetzel, Korntal-Muenchingen (DE); Linus Ferlinz, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/279,827

(22) PCT Filed: Aug. 22, 2019

(86) PCT No.: PCT/EP2019/072485
§ 371 (c)(1),
(2) Date: Mar. 25, 2021

(87) PCT Pub. No.: WO2020/064232
PCT Pub. Date: Apr. 2, 2020

(65) Prior Publication Data
US 2021/0396309 A1 Dec. 23, 2021

(30) Foreign Application Priority Data
Sep. 28, 2018 (DE) ...................... 10 2018 216 728.1

(51) Int. Cl.
| F16H 63/34 | (2006.01) |
| F16H 57/029 | (2012.01) |
| F16H 57/00 | (2012.01) |
| F16H 57/02 | (2012.01) |
| F16H 57/021 | (2012.01) |

(52) U.S. Cl.
CPC ....... F16H 63/3425 (2013.01); F16H 57/029 (2013.01); F16H 63/3466 (2013.01);
(Continued)

(58) Field of Classification Search
CPC ............... F16H 63/3425; F16H 57/029; F16H 63/3466; F16H 2057/0056;
(Continued)

(56) References Cited

U.S. PATENT DOCUMENTS 5,799,536 A * 9/1998 Janiszewski ............ B60T 1/005
74/331
11,137,073 B2 * 10/2021 Klein .................. F16H 63/3425
(Continued)

FOREIGN PATENT DOCUMENTS

DE 102011086547 A1 6/2012
DE 102011080972 A1 2/2013
(Continued)

OTHER PUBLICATIONS

Machine translation of JP2013170699A (Year: 2022).*
Translation of International Search Report for Application No. PCT/EP2019/072485 dated Jan. 29, 2020 (3 pages).

*Primary Examiner* — Stacey A Fluhart
(74) *Attorney, Agent, or Firm* — Michael Best & Friedrich LLP

(57) ABSTRACT

The invention relates to a gearbox (40) having a park lock (42) which is integrated in a gearbox housing (60) of the gearbox (40). Said park lock comprises a transfer device (48), a detent (50), and a park lock gear (52). Outside the gearbox housing (60) there is an electromechanical actuator (44), which is centred on an interface to the transfer device (48) on the gearbox housing (48) and is sealed off from the gearbox housing (60) there.

18 Claims, 2 Drawing Sheets

(52) U.S. Cl.
CPC ............... *F16H 2057/0056* (2013.01); *F16H 2057/0216* (2013.01); *F16H 2057/02034* (2013.01); *F16H 2057/02082* (2013.01)

(58) Field of Classification Search
CPC . F16H 2057/02034; F16H 2057/02082; F16H 2057/0216; F16H 2057/02086; F16H 63/3458
See application file for complete search history.

(56) References Cited

U.S. PATENT DOCUMENTS

| | | | |
|---|---|---|---|
| 2009/0037430 A1* | 2/2009 | Mukkamala | G06F 16/252 709/248 |
| 2011/0290615 A1 | 12/2011 | Schwekutsch et al. | |
| 2016/0061323 A1* | 3/2016 | Larsson | F16H 63/3433 74/411.5 |
| 2017/0292605 A1* | 10/2017 | Hamaya | F16D 63/006 |
| 2018/0154881 A1* | 6/2018 | Heubner | F16D 65/14 |
| 2021/0332877 A1* | 10/2021 | Li | F16H 63/3466 |

FOREIGN PATENT DOCUMENTS

| | | |
|---|---|---|
| DE | 102012004395 A1 | 9/2013 |
| DE | 102012210571 A1 | 12/2013 |
| EP | 2264335 A2 | 12/2010 |
| EP | 3333463 A1 | 6/2018 |
| JP | 2013170699 A * | 9/2013 |

* cited by examiner ns to an electromechanically actuated parking lock, which is notable for a particularly compact design.

DE 10 2011 080 972 A1 relates to a locking device. The locking device serves for blocking an electric drive, which refers to an electric vehicle drive. The locking device comprises a rotatably arranged gear, which has first form-fitting elements, furthermore a latching element, which has a second form-fitting element. In a blocking state, this engages with form fit in at least one of the first form-fitting elements so that the gear is blocked and, in an unblocked state, it is disengaged in relation to the gear. The locking device here is designed as a separate unit which is accommodated in its own housing.

DE 10 2011 086 547 A1 has a parking lock as its subject matter. The parking lock has a locking detent, which can be pivoted about a pivot axis and has a tooth for engagement in a locking serration. Furthermore, an actuating unit which can be mechanically coupled to the locking detent is provided, via which the detent tooth can be brought into reversible engagement against the locking serration and can be acted upon by an actuator. The gearbox has a gearbox housing with an opening into which the parking lock, which is manufactured separately from the gearbox housing, is inserted as a structural unit such that it at least partially closes the opening as part of the gearbox housing.

DE 10 2012 210 571 A1 has a device for actuating a blocking mechanism as its subject matter. The device has a piston unit, which is arranged to be displaceable in the axial direction, furthermore a latching device, which is self-activating in an axial position of the piston unit which is equivalent to an open state of the blocking mechanism. This latching device serves to hold the piston unit in the axial position which is equivalent to the open state of the blocking mechanism. An actuating device for actuating a release element is furthermore provided, which release device serves for deactivating the latching device. The latching device is designed to be self-activating for holding the piston unit in an axial position which is equivalent to a closed state of the blocking mechanism. To enable a movement of the piston unit starting from the axial position which is equivalent to the closed state of the blocking mechanism in the direction of the open state of the locking mechanism, this latching device can be deactivated in an equivalent axial position.

DE 10 2012 004 395 A1 relates to a parking lock arrangement, a gearbox and a motor vehicle. A parking lock gear wheel is provided, which is coupled in a torsion-resistant manner to a gearbox shaft. Furthermore, a locking detent is provided, which is mounted on a gearbox housing such that it can be pivoted parallel to the parking lock gear wheel plane and which carries a locking hook movable between a first pivotal position, in which the locking hook is positioned radially outside the teeth of the parking lock gear wheel, and a second pivotal position, in which the locking hook engages between two teeth of the parking lock gear wheel. A lever arrangement, which is linked parallel to the parking lock gear wheel plane, can be transferred from the first to the second pivotal position by means of its locking detent. The locking detent is linked to the free end of the coupling limb of a toggle lever, whereof the main limb is linked to the gearbox housing at a radial spacing from the parking lock gear wheel, which spacing is dimensioned such that the transfer of the toggle lever from an angled toggle lever position to an extended toggle lever position brings about the transfer of the locking detent from the first to the second pivotal position.

Parking locks are generally mechanical devices which prevent a parked vehicle from rolling by mechanically blocking a gearbox shaft. The blocking action is achieved via a form fit between a parking lock gear and a detent, wherein the parking lock gear is connected in a torsion-resistant manner to a gearbox shaft which is connected directly to at least one drive axle of the vehicle via a plurality of gear wheels. The mechanical device of a parking lock ensures that the detent is pressed into a gap in the parking lock gear and is held there, for example in opposition to the force which is generated as a result of parking the vehicle on a slope, for example.

SUMMARY OF THE INVENTION

According to the invention, a gearbox is proposed, having a parking lock which is integrated in a gearbox housing of the gearbox and comprises a transfer device, a detent and a parking lock gear. An electromechanical actuator is arranged outside the gearbox housing, which actuator is centered in relation to the transfer device on an interface on the gearbox housing and is sealed off from the gearbox housing there.

The advantage of the solution proposed according to the invention is realized in that an interface to the transfer device on the gearbox housing is designed as an intermediate piece, which has sealing elements on the one hand and a shaft piece on the other such that, after the assembly of the device in the gearbox housing has taken place, the intermediate piece, which accommodates a shaft piece, and the electromechanical actuator can be ideally centered with respect to one another relative to the firstly assembled mechanical device.

In a further development of the solution proposed according to the invention, the intermediate piece is sealed off from the gearbox housing and accommodates a drive shaft of the electromechanical actuator.

The intermediate piece advantageously has a shaft seal and an axial sealing ring, which are both incorporated in the intermediate piece and abut against a shaft piece and the gearbox housing respectively. The sealing function in the intermediate-piece assembly group is advantageously implemented both in relation to the gearbox housing and the rotating shaft piece.

The intermediate piece advantageously has the shaft piece, the shaft sealing ring and the axial seal so as to realize a tolerance-compensating assembly option which is easily fixed on the gearbox housing, in particular within the framework of a floating bearing.

In a development of the idea proposed according to the invention, the detent of the parking lock and a deflection means, which transfers the force of the actuator to a locking element associated with the detent, are mounted at one and the same bearing point with mutually deviating force directions of the force of the actuator and the actuating force of the locking element. The bearing point for the deflection means and the detent is, in particular, a stay bolt formed in the gearbox housing. The force of the actuator is transferred to the deflection means via a linear movement of a rack and this deflection means transfers an actuating force to the locking element in a direction which differs from the force direction of the force of the actuator. In particular, the force direction of the force which the electromechanical actuator applies is perpendicular to the actuating force of the locking element which actuates the detent associated with the parking lock gear. To transfer the force of the electromechanical actuator which is arranged outside the gearbox housing, the transfer device comprises a gear wheel and a rack, wherein the rack actuates the deflection means via a coupling member, for example a coupling plate.

The force of the actuator is advantageously transferred to a push rod, on which the locking element actuating the detent is accommodated, such that the said force is rotated through 90° via the deflection means.

In particular, the electromechanical actuator assembled outside the gearbox housing is a simple and cost-effective electric motor.

The invention moreover relates to a method for assembling a gearbox, wherein the following method steps are performed:

a) assembling the transfer device in the oil chamber of the gearbox housing, b) inserting a drive shaft of the intermediate piece into a gear wheel shaft of the transfer device, c) aligning the drive shaft of the intermediate piece with respect to the gear wheel shaft, d) fixing the intermediate piece in a sealing manner on the gearbox housing in the assembly position of the intermediate piece which is established according to method step c), and e) assembling the electromechanical actuator outside the gearbox housing in a torsion-resistant manner on a shaft piece, such that the intermediate piece and the electromechanical actuator are centered with respect to one another with respect to the transfer device assembled according to method step a).

The intermediate piece can furthermore be fixed on the gearbox housing, in particular by means of a floating bearing.

Finally, the invention relates to the use of the gearbox having a parking lock integrated in a gearbox housing of the gearbox in an electric vehicle having at least one electric drive.

The solution proposed according to the invention advantageously enables the use of a reduced number of parts for implementing the parking lock within a gearbox. If a pivot bearing is formed by a stay bolt in the gearbox housing, for example, this can simultaneously accommodate the detent associated with the parking lock gear and, on the other hand, a deflection lever of the deflection means. This involves particularly little effort during assembly. Simpler tolerance conditions moreover prevail, since, when assembling the gearbox cover on the gearbox housing, only one stay bolt has to be joined to both parts and not a plurality of stay bolts as in the case of a separate bearing for the detent and for the deflection means. Due to the use of a compact deflection means, it is possible to allow for restricted installation space conditions in a gearbox housing. Furthermore, as a result of the solution proposed according to the invention, a compact design of a parking lock function can, in particular, be achieved.

As a further advantage, it should be mentioned that the electromechanical actuator, which is arranged in particular outside the oil chamber of the gearbox housing, can be a simple, cost-effective electric motor which possibly comprises attached electronics. Owing to the arrangement outside the oil chamber, the electric motor does not need to be designed in an oil-tight manner; furthermore, it does not need to be subject to any particular requirements in terms of temperature resistance, since it is not installed within the gearbox housing. Instead, the electromechanical actuator which is attached on the outside can be designed as an unsealed actuator and accommodated, for example, within a depression which is sealed with a cover. The compensation of bearing tolerances between the parking lock components within the oil chamber and the electromechanical actuator assembled outside the gearbox housing can be compensated, for example, in that the drive shaft of the electromechanical actuator on the transfer device, which is arranged in the interior of the gearbox housing, i.e. in the oil chamber, in order to transfer the torque of the actuator.

To achieve robust sealing between the components of the parking lock proposed according to the invention, the sealing components are inserted in an intermediate piece. This comprises a shaft piece and is orientated and aligned during assembly on the transfer device assembled in the gearbox housing. It is thus advantageously achieved that the seals are ideally aligned centrically. The intermediate piece can then be fixed on the gearbox housing via an axial seal, for example by means of a floating bearing. It is thus possible to achieve robust sealing with an optimal sealing function as well as simpler assembly, since tolerances are compensated.

Owing to the arrangement of the actuator outside the oil chamber, simple and safe replacement of the actuator is possible in the event of a repair. It is no longer necessary to open the gearbox and drain off the oil and refill the oil.

Owing to the arrangement of the actuator within a depression in the gearbox housing combined with a tightly closing, stable cover, the actuator and the attached electronics are located in a protected space which provides optimum protection against environmental influences such as spray water, driving through puddles, driving through water on flooded roads (customer requirement: immersion-proofing), cleaning with pressure washers and mechanical loads such as occur when a vehicle is on uneven ground or as a result of rock fall. A water-tight electromechanical actuator which is screwed to the outside of the gearbox housing could be impaired, broken or heavily damaged by such mechanical loads, particularly when the vehicle is an SUV. The positioning of the transfer device in the oil chamber via the system comprising stay bolts and a bore (clearance) in the gearbox housing results in cost-effective and very precise positioning. In manufacturing terms, a bore with a clearance and a bolt as a standard part can be produced in the µm range with relatively little effort.

BRIEF DESCRIPTION OF THE DRAWINGS

The invention is described in more detail below with reference to the drawing, which shows.

DETAILED DESCRIPTION

Figure 1:
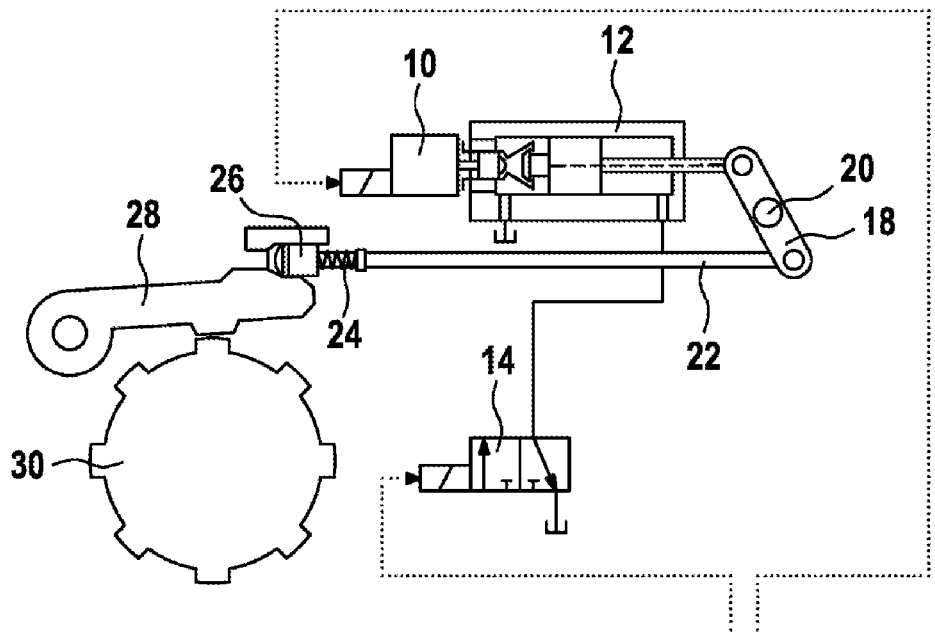
FIG. 1 a parking brake known from the prior art.

FIG. 1 shows a locking magnet 10, which is associated with a hydraulic cylinder 12. The hydraulic cylinder 12 actuates a lever and is acted upon via a hydraulic valve 14. The lever 18 is accommodated approximately centrally on a lever bearing 20 and can be pivoted about this. The lever 18 and the lever bearing 20 are deflected via the hydraulic cylinder 12 and actuate a push rod 22 in opposition to a pre-tensioning force of a spring 24. The push rod 22 is provided with a locking part 26, which in turn actuates a detent 28 which cooperates with a parking lock gear 30.

Figure 2:
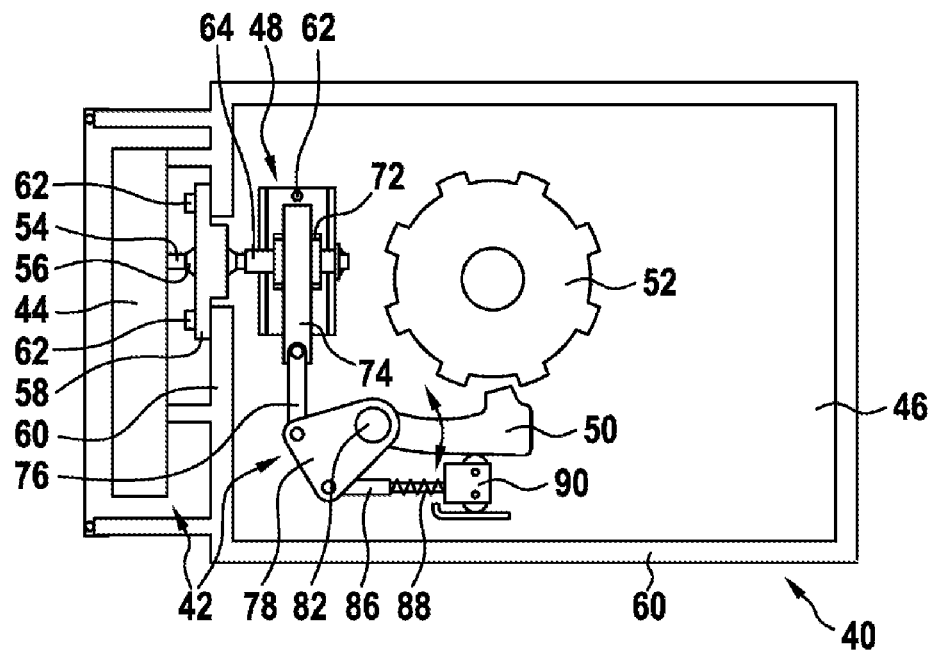
FIG. 2 an illustration of the parking lock proposed according to the invention, with components arranged outside the gearbox housing and with components integrated in the gearbox housing, FIG. 3 an enlarged illustration of the intermediate piece and FIG. 4 a plan view of a gearbox illustrated in partial section.

The illustration according to FIG. 2 reveals a gearbox 40 proposed according to the invention. This gearbox comprises a parking lock 42 which is actuated via a preferably electromechanical actuator 44 arranged outside the gearbox housing 60. This actuator is a simple and cost-effective electric motor, which is not oil-tight and does not have to be designed to be sealed against environmental influences of the motor chamber and which, in particular, does not have to satisfy high requirements relating to temperature resistance.

As revealed in the illustration according to FIG. 2, the gearbox housing 60 delimits an oil chamber 46. A parking lock gear 52, with which a detent 50 is associated, is located within the oil chamber. This detent is actuated via a transfer device 48 which is acted upon by the electromechanical actuator 44.

According to the illustration in FIG. 2, for example, the electromechanical actuator 44 is arranged outside the gearbox housing 60 and lies protected in a depression, which is tightly closed by a cover, and acts on a drive shaft 54. The drive shaft 54 is connected to a gear wheel shaft 64 with the interconnection of the shaft piece 56. The transfer device 48 is fixed in the oil chamber 46 of the gearbox housing 60 by fastening elements 62.

The transfer device 48 comprises a gear wheel 72, which is accommodated on the gear wheel shaft 64 and acts on a rack 74. The rack 74 is connected to a coupling member 76 designed, for example, as a coupling plate.

As is furthermore revealed in the illustration according to FIG. 2, the coupling member 76 actuates a deflection means 78, which is accommodated on a pivot bearing 82. The pivot bearing 82 is, in particular, a stay bolt which is accommodated in the gearbox housing 60. In addition to the deflection means 78, the detent 50 is also simultaneously accommodated on the pivot bearing 82, which detent is capable of moving about the pivot bearing 82 according to the double-headed arrow.

The deflection means 78 is furthermore connected to a push rod 86 on which a spring 88 is located. Located at the end of the push rod 86 is a locking element 90, which has, for example, two opposing rollers of which one abuts against a guide in the gearbox housing 60 and the other contacts the detent 50. As a result of its tooth geometry, the detent 50 is pushed out of the parking lock gear 52 when the locking element 90 is moved away, wherein this movement is promoted by a restoring spring 92 (not illustrated) which, in the disengaged state, also fixes the detent 50 in position such that it is not moved in the direction of the parking lock gear 52 as a result of the vehicle vibrating.

Upon the actuation of the electromechanical actuator 44, the drive shaft 54 thereof drives the shaft piece 56, which is accommodated in the intermediate piece 58. The rotation of the shaft piece 56 results in a rotational movement of the gear wheel shaft 64 on which the gear wheel 72 is in turn accommodated. The rotation of the gear wheel 72 results in a vertical movement of the rack 74, which movement is transferred to the deflection means 78 via the coupling member 76. The deflection means 78 transfers the substantially vertical movement of the coupling member 76 to a push rod 86 in a force direction which is offset through preferably 90° from the said vertical movement. The locking element 90, which is pre-tensioned by a spring 88, is accommodated on the push rod 86. The locking element 90 has, for example, two mutually opposing rollers, of which one contacts the detent 50 and the one opposite rolls along a guide which is constructed in the gearbox housing 60.

Both the deflection means 78 and the detent 50 are mounted on one and the same pivot bearing 82, which is designed, for example, as a stay bolt incorporated in the gearbox housing 60. The detent 50 comprises an extension which, upon actuation of the locking element 90, engages in gaps in a parking lock gear 52 and blocks this latter so that a rotation of the parking lock gear 52 is prevented.

Figure 3:
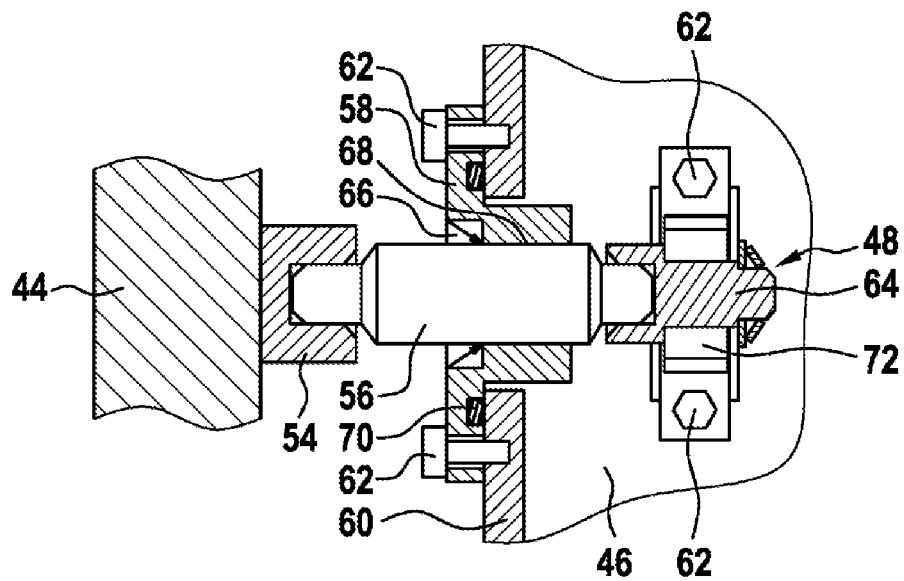

FIG. 3 shows, in an enlarged illustration, the arrangement of the intermediate piece on the gearbox housing 60. As revealed in FIG. 3, the electromechanical actuator 44 has the drive shaft 54. One end of the shaft piece 56 is inserted in a torsion-resistant manner into this drive shaft 54, whilst its other end is inserted in a torsion-resistant manner into a correspondingly configured opening in a gear wheel shaft 64. The shaft piece 56 is guided in a guide plate 68. In turn located on the gear wheel shaft 64 is a gear wheel 72, which cooperates with a rack 74 (not illustrated in FIG. 3; c.f. the illustration according to FIG. 2 or 4).

From the enlarged illustration according to FIG. 3, it is furthermore revealed that the transfer device 48 is fastened to the base of the oil chamber 46 of the gearbox housing 60 by fastening elements 62 designed here as screws, for example.

The intermediate piece 58, which accommodates the shaft piece 56, moreover comprises an axial sealing ring 70 incorporated in a recess and a shaft sealing ring 66. The shaft sealing ring 66 is positioned against the upper surface of the shaft piece 56, whilst, during the assembly of the intermediate piece 58, this latter is fastened to the gearbox housing 60 by tightening the fastening elements 62 after it has been aligned in relation to the position of the gear wheel shaft 64. Since the axial sealing ring 70 is compressed, the intermediate piece 58, after assembly, is sealed off from the gearbox housing 60, in particular the internal oil chamber 46.

During the assembly of the gearbox proposed according to the invention, the transfer device 48 is firstly fastened to the base of the oil chamber 46 by the fastening elements 62. The intermediate piece 58, or the shaft piece 56 accommodated therein, is then aligned and centered in the gear wheel shaft 64 of the transfer device 48 from the outside. In this aligned position, the intermediate piece 58 is fixed on the gearbox housing 60 in a sealing manner, which takes place by tightening the fastening elements 62 designed here as screws. The electromechanical actuator 44 is then pushed onto the shaft piece 56 in a torsion-resistant manner, for example by means of a Torx connection, and fixed in relation to the gearbox housing 60 by fastening elements 62. Therefore, both the intermediate piece 58 and the electromechanical actuator 44 are orientated with respect to the transfer device 48, which is firstly assembled within the oil chamber 46 in the gearbox housing 60 of the gearbox 40, and are ideally centered with respect to one another.

As is further revealed in FIG. 3, both the shaft sealing ring 66 and the axial sealing ring 70 are located within the intermediate piece 58. The bearing point and the sealing function are accordingly aligned centrically with respect to the shaft piece 56 and therefore ensure an optimum sealing function. The positional tolerances between the intermediate piece 58 on the one hand and the fastening elements 62 is compensated by play between them. At the same time, the axial sealing ring 70 is pressed against the gearbox housing 60 in a sealing manner by the fastening elements 62.

Figure 4:
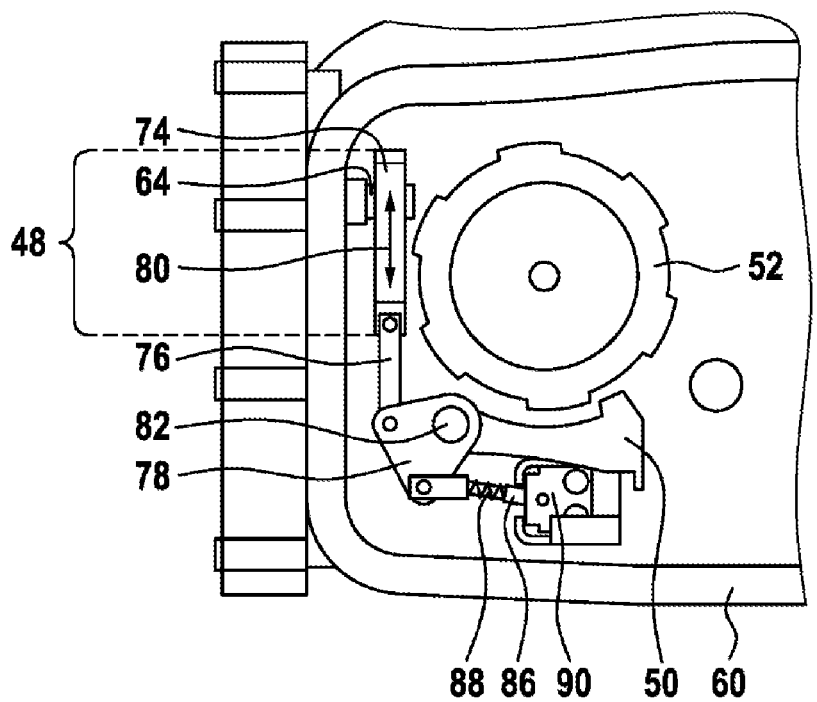

As revealed in the illustration according to FIG. 4, the gear wheel shaft 64 is connected in a torsion-resistant manner to the gear wheel 72. The gear wheel 72 is driven by the electromechanical actuator 44 (c.f. the illustration according to FIG. 3) via the drive shaft 54 and the shaft piece

56. The rack 74 converts the rotational movement of the gear wheel 72 into a linear movement 80 and transfers this to the deflection means 78 via the coupling member 76. As per the solution proposed according to the invention, this deflection means is mounted on the pivot bearing 82, which is designed as a stay bolt and arranged in the gearbox housing 60. The pivot bearing 82 is simultaneously also the bearing of the detent 50. A very compact construction is thus enabled; furthermore, adaptation to extremely confined surroundings is possible. The deflection means 78 transfers its movement to the push rod 86 and this, in turn, to the spring 88 which is arranged on the push rod 86 and, from there, to the locking element 90. The locking element 90 is of a type which comprises two mutually opposing rollers, for example, of which one rolls along a guide within the gearbox housing 60 and the other actuates the detent 50.

As a result of a movement of the locking element 90 to the right, the detent 50 is pressed upwards and engages in a gap at the periphery of the parking lock gear 52. Upon the retraction of the locking element 90 to the left, the detent 50 is freed and is pressed back downwards by a restoring spring 92 (not illustrated), i.e. it moves out of engagement with the parking lock gear 52 so that this is freed again in the direction of rotation.

The invention is not restricted to the exemplary embodiments described here and the aspects highlighted therein. Instead, a plurality of modifications which lie within the capabilities of the person skilled in the art are possible within the scope specified by the claims.

The invention claimed is:

1. A gearbox (40) comprising
a parking lock (42) which is integrated inside a gearbox housing (60) of the gearbox (40), the parking lock (42) including
a transfer device (48),
a detent (50) and
a parking lock gear (52),
characterized in that an electromechanical actuator (44) is arranged outside the gearbox housing (60), which actuator is centered with respect to the transfer device (48) on an interface on the gearbox housing (60) and is sealed off from the gearbox housing (60) at the interface
wherein the interface is formed as an intermediate piece (58) which is sealed off from the gearbox housing (60) and accommodates a drive shaft (54) of the electromechanical actuator (44),
wherein the intermediate piece (58) has a shaft sealing ring (66) and an axial sealing ring (70), which are both incorporated in the intermediate piece (58) and are positioned against a shaft piece (56) and the gearbox housing (60) respectively.

2. The gearbox (40) as claimed in claim 1, characterized in that the intermediate piece (58) with the shaft piece (56), the axial sealing ring (70) and the shaft sealing ring (66) is centered in relation to a gear wheel shaft (64) of the transfer device (48) on the gearbox housing (60).

3. The gearbox (40) as claimed in claim 1, characterized in that the detent (50) of the parking lock (42) and a deflection means (78), which transfers the force of the electromechanical actuator (44) to a locking element (90) associated with the detent (50), are mounted on one and the same pivot bearing (82) with mutually deviating force directions of the force of the actuator (44) and the actuating force of the locking element (90).

4. The gearbox (40) as claimed in claim 3, characterized in that the force of the electromechanical actuator (44) is transferred to the deflection means (78) via a linear movement (80) of a rack (74) and this deflection means transfers an actuating force to the locking element (90) in a direction which differs from the force direction of the force of the actuator (44).

5. The gearbox (40) as claimed in claim 4, characterized in that the force direction of the force of the electromechanical actuator (44) is perpendicular to the actuating force of the clamping element (90).

6. The gearbox (40) as claimed in claim 3, characterized in that the transfer device (48) comprises a gear wheel (72) and a rack (74) which actuate the deflection means (78) via a coupling member (76).

7. The gearbox (40) as claimed in claim 3, characterized in that the deflection means (78) transfers the force of the electromechanical actuator (44) to a push rod (86), on which the locking element (90) actuating the detent (50) is accommodated, such that the said force is offset through 90°.

8. The gearbox as claimed in claim 3, wherein the deflection means (78) is a pivoting bracket, wherein the gearbox further includes a coupling member (76) coupled to both the electromechanical actuator (44) and the pivoting bracket, and a push rod (86) coupled to both the pivoting bracket and the locking element (90).

9. The gearbox (40) as claimed in claim 1, characterized in that the electromechanical actuator (44) is an electric motor.

10. A vehicle comprising at least one electric drive and the gearbox (40) as claimed in claim 1.

11. A gearbox (40) comprising
a parking lock (42) which is integrated in a gearbox housing (60) of the gearbox (40), the parking lock (42) including
a transfer device (48),
a detent (50) having a locking element (90), and
a parking lock gear (52),
characterized in that the transfer device (48) has a deflection means (78) which is pivotally arranged on a pivot bearing (82) which simultaneously represents a bearing of the detent (50), wherein the deflection means (78) is a pivoting bracket that is configured to transfer a force from an electromechanical actuator (44) to the locking element (90), wherein the force from the electromechanical actuator (44) is configured to extend along a first direction, and wherein the bracket is configured to be rotated by the force from the electromechanical actuator (44), and to generate an actuating force for the locking element (90) that extends along a second direction different than the first direction.

12. A vehicle comprising at least one electric drive and the gearbox (40) as claimed in claim 11.

13. A method for assembling the gearbox (40) as claimed in claim 11, having the following method steps:
a) assembling the transfer device (48) in an oil chamber (46) of the gearbox (40),
b) inserting a shaft piece (56) of an intermediate piece (58) into a gear wheel shaft (64) of the transfer device (48),
c) aligning the shaft piece (56) of the intermediate piece (58) with respect to a drive shaft (54) of the transfer device (48),
d) fixing the intermediate piece (58) in a sealing manner on the gearbox housing (60) in an alignment position of the intermediate piece (58) which is established according to method step c), and
e) assembling an electromechanical actuator (44) outside the gearbox housing (60) in a torsion-resistant manner on the shaft piece (56), such that the intermediate piece (58) and the electromechanical actuator (44) are centered with respect to one another on the transfer device (48) assembled according to method step a).

14. The method as claimed in claim 13, characterized in that the intermediate piece (58) is fixed on the gearbox housing (60) by means of a floating bearing.

15. The gearbox as claimed in claim 11, further comprising the electromechanical actuator (44), and wherein the first direction is perpendicular to the second direction.

16. A method for assembling a gearbox (40) having a parking lock (42) which is integrated inside a gearbox housing (60) of the gearbox (40), the parking lock (42) including a transfer device (48), a detent (50), and a parking lock gear (52), the gearbox (40) also having an electromechanical actuator (44) arranged outside the gearbox housing (60), which actuator is centered with respect to the transfer device (48) on an interface on the gearbox housing (60) and is sealed off from the gearbox housing (60) at the interface, the method having the following method steps:
   a) assembling the transfer device (48) in an oil chamber (46) of the gearbox (40),
   b) inserting a shaft piece (56) of an intermediate piece (58) into a gear wheel shaft (64) of the transfer device (48),
   c) aligning the shaft piece (56) of the intermediate piece (58) with respect to a drive shaft (54) of the transfer device (48),
   d) fixing the intermediate piece (58) in a sealing manner on the gearbox housing (60) in the alignment position of the intermediate piece (58) which is established according to method step c), and
   e) assembling the electromechanical actuator (44) outside the gearbox housing (60) in a torsion-resistant manner on the shaft piece (56), such that the intermediate piece (58) and the electromechanical actuator (44) are centered with respect to one another on the transfer device (48) assembled according to method step a).

17. The method as claimed in claim 16, characterized in that the intermediate piece (58) is fixed on the gearbox housing (60) by means of a floating bearing.

18. A gearbox (40) comprising
   a parking lock (42) which is integrated inside a gearbox housing (60) of the gearbox (40), the parking lock (42) including
      a transfer device (48),
      a detent (50) and
      a parking lock gear (52),
   characterized in that an electromechanical actuator (44) is arranged outside the gearbox housing (60), which actuator is centered with respect to the transfer device (48) on an interface on the gearbox housing (60) and is sealed off from the gearbox housing (60) at the interface;
   wherein the detent (50) of the parking lock (42) and a deflection means (78), which transfers the force of the electromechanical actuator (44) to a locking element (90) associated with the detent (50), are mounted on one and the same pivot bearing (82) with mutually deviating force directions of the force of the actuator (44) and the actuating force of the locking element (90).

* * * * *